United States Patent [19]
Zykan et al.

[11] Patent Number: 6,073,352
[45] Date of Patent: Jun. 13, 2000

[54] LASER BOW SIGHT APPARATUS

[75] Inventors: Blair J. Zykan, Englewood; Jeremy G. Dunne, Littleton, both of Colo.

[73] Assignee: Laser Technology, Inc., Englewood, Colo.

[21] Appl. No.: 09/044,447

[22] Filed: Mar. 19, 1998

[51] Int. Cl.[7] .................................................. F41G 1/467
[52] U.S. Cl. ....................................... 33/265; 33/DIG. 21
[58] Field of Search .............................. 33/265, DIG. 21; 356/3, 4.01, 5.01; 124/87

[56] References Cited

U.S. PATENT DOCUMENTS

| | | | |
|---|---|---|---|
| 3,950,098 | 4/1976 | Caine | 356/3 |
| 4,617,741 | 10/1986 | Bordeaux et al. | 33/265 |
| 4,894,921 | 1/1990 | Barlow | 33/265 |
| 5,419,050 | 5/1995 | Moore | 33/DIG. 21 |
| 5,442,861 | 8/1995 | Lorocco | 33/265 |
| 5,495,675 | 3/1996 | Huang | 33/DIG. 21 |
| 5,560,113 | 10/1996 | Simo et al. | 33/265 |
| 5,575,072 | 11/1996 | Eldridge | 33/265 |
| 5,619,801 | 4/1997 | Slates | 33/265 |
| 5,652,651 | 7/1997 | Dunne | 356/5.01 |
| 5,685,081 | 11/1997 | Winegar | 33/265 |

OTHER PUBLICATIONS

Bushnell Corporation Advertisement, "Yardage Pro Bow 20–0100", 1997.
Catalog Advertisement for Fine–Line, Inc., pp. 1–4 (no date).
Catalog Advertisement for TRUGLO, Inc., pp. 1–5, 1998.
Catalog Advertisement for Highlander Sports, Inc., pp. 3–5, 1998–99.
Catalog Advertisement for Browning sights, pp. 29–30, Browning Archery Catalog, 1997.

*Primary Examiner*—G. Bradley Bennett
*Attorney, Agent, or Firm*—William J. Kubida; Carol W. Burton; Hogan & Hartson LLP

[57] ABSTRACT

A laser rangefinder bow sight adapted for use preferably with a conventional multi-pin bow sight having a frame and a plurality of sighting pins adjustably positioned on said frame. The laser rangefinder has a housing removably fastened to the bow sight frame. The housing supports a laser transmit section, a laser receive section, a precision timing section and a central processing unit (CPU) for measuring distance to a target coupled to an LCD display. The CPU also provides outputs to a plurality of range window indicator lights which are preferably LEDs. The indicator lights may be externally mounted to the bow sight pins or mounted within the rangefinder housing. In the latter case, a plurality of optical fibers are connected to the distance window lights in the housing. Each of the sighting pins is optically coupled to a separate one of the plurality of distance window lights via one of the optical fibers. The rangefinder is actuated via a remote trigger switch connected through the power supply in the housing to each of the sections. When the rangefinder is triggered, the CPU determines the target distance and activates one or more of the distance window LEDs for the range window or windows closest to the measured distance. Light is then transmitted via the optical fibers to the sighting pins, thus illuminating the one or two sighting pins corresponding to the measured distance. The display is held for a predetermined period of time or until the archer actuates the remote switch to take another distance measurement.

24 Claims, 3 Drawing Sheets

LASER BOW SIGHT APPARATUS

BACKGROUND OF THE INVENTION

1. Field of the Invention

This invention relates generally to the field of archery bow sights, and more particularly to a modular laser range finder apparatus adapted to be mounted and integrated into a bow sight.

2. Description of the Related Art

Bow sights have long been known for use with archery bows. They range from simple pin markers to peep sights, to vertically aligned series of horizontal pins mounted in a generally annular frame to protect the pins. These latter multi-pin sights have proliferated in the last few years, especially in the hunting arena, where the distance to a target or target animal can vary as much as from 10 to 60 yards. In the bow hunting situation, the trajectory of an arrow must be accurately predicted if an archer is to have any confidence in accurate shot placement. Since the typical range to a target may vary substantially, it is critical that a good estimate of the distance for a particular shot be known with some degree of accuracy. The archer typically has to premeasure or step off the distance to an anticipated target location from the archer's tree stand, blind, or other shooting location. Alternatively he or she must simply guess as to the appropriate distance in order to compensate for the effects of gravity on an arrow in flight to the target. In the past, there have been few tools to aid the archer in this endeavor.

One such tool has been a multiple pin sight. Normal multi-pin sights simply have several brass aiming pins which stick out horizontally from a vertical frame mounted in front of the hand grip on the bow. Each pin corresponds to a particular target distance. The archer visually estimates the appropriate range and then sights to the target using the appropriate aiming pin corresponding to that range. Recently an enhancement to the multi-pin sight has been introduced. This sight has light gathering fiber optic filaments which provide a self powered illuminated dot that the archer sees at the end of each aiming pin. These fiber optic multiple pin sights have greatly improved the utility of such sights in low light or low contrast lighting situations.

To address the accuracy of range estimating, a laser rangefinder sight has been marketed by Bushnell of Overland Park Kans. This rangefinder system has a laser range finding instrument mounted above a multiple pin bow sight. The rangefinder is actuated by a switch that is pressed by the archer's finger when the bow sight is aimed at a target. While the switch is depressed, the rangefinder senses the target. The laser rangefinder then calculates and displays the distance to the target to the archer. The archer then chooses which of several sighting pins to align with the target based on the distance displayed. For example, if the archer has preset the pins to distances of 10, 20, 30, 40, and 50 yards, the archer would choose the pin closest to the displayed target distance. In one model, the Bushnell laser rangefinder is integral with the multiple pin sight. The entire sight may be removed from the bow and used as a hand held distance measurement device. In another model, the rangefinder is modular and may be removed from the bowsight for use as a hand held distance measuring device.

One of the major disadvantages with the Bushnell rangefinder is that this laser rangefinder only indicates the range when aimed, line of sight, at the target. Thus, after the range is determined, the archer must disregard the rangefinder reading while actually aiming the bow, i.e. raising the bow such that the appropriate distance pin of the bow sight is aligned with the target. The archer may easily mistakenly choose the incorrect pin with which to aim at the target, resulting in a missed shot. Another disadvantage is that this rangefinder does not correlate the measured range directly with the particular sight pin being used.

Therefore there is a need for a versatile archery laser rangefinder directly indicates the correct target range to the archer even as the arrow is being aimed at the target and elevation compensated for the actual target distance. There is further a need for an integrated bow sight which automatically tells the archer which of a plurality of range pins to utilize when aiming at a particular target so as to avoid the potential for using the wrong pins.

SUMMARY OF THE INVENTION

The primary object of the present invention is to provide a fiber optic bow sight which automatically indicates which sight pin or pins to utilize to accurately aim at a target.

Another object of the present invention is to provide a laser rangefinder for a fiber optic bow sight which converts the sight into one which automatically indicates which sight pin or pins to utilize to accurately aim at a target.

One preferred embodiment of the present invention is a laser rangefinder that is removably attached to the top of the frame of a conventional multi-pin bow sight. This embodiment provides an LCD display of target distance to an archer when the archer aims directly at a target and presses a range switch. The range is then retained on the LCD display until the archer activates the switch again to take a subsequent range measurement. In addition, an indicator light is mounted on each of the aiming pins that lights according to a predetermined range window programmed into the laser rangefinder so that the archer can readily utilize the indicated sight pin rather than concentrate on the LCD display of the distance. The LCD display is positioned immediately above the multiple range pins on the sight so that the archer need not alter his or her aim substantially to verify the target distance and pin selection during aiming.

A second preferred embodiment of the present invention further comprises the rangefinder having a plurality of range window indicators in the rangefinder housing and an optical fiber cable bundle connected to the range window indicators. Each indicator feeds one fiber which is in turn positioned on or in one of the sight or aiming pins. If the detected range is within a window, that window fiber is illuminated. The result is one or more aiming pins are illuminated to indicate to the archer which aiming pin or pins to use in aiming at a target.

Another embodiment of the present invention is a bow having an integral laser rangefinder incorporated into the frame of the bow. A conventional fiber optic bow sight may be attached to the bow and the rangefinder fiber optic cable connected to the aiming pins and to the rangefinder. This embodiment preferably includes a trigger switch integrated into the grip portion of the bow frame.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

Figure 1:
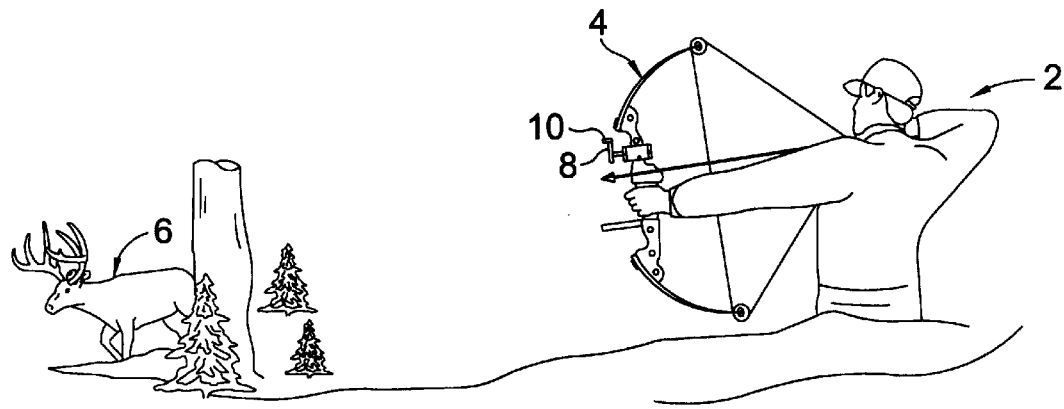
FIG. 1 is a scene of an archer taking aim at a target animal utilizing a bow sight in accordance with the invention.

Turning now to the drawing, a simplified view of a hunter or archer 2 drawing and aiming a bow 4 at a target 6 is shown in FIG. 1. The hunter 2 uses a multi-pin bow sight 8 upon which a laser rangefinder 10 is mounted in accordance with a first embodiment of the invention.

Figure 3:
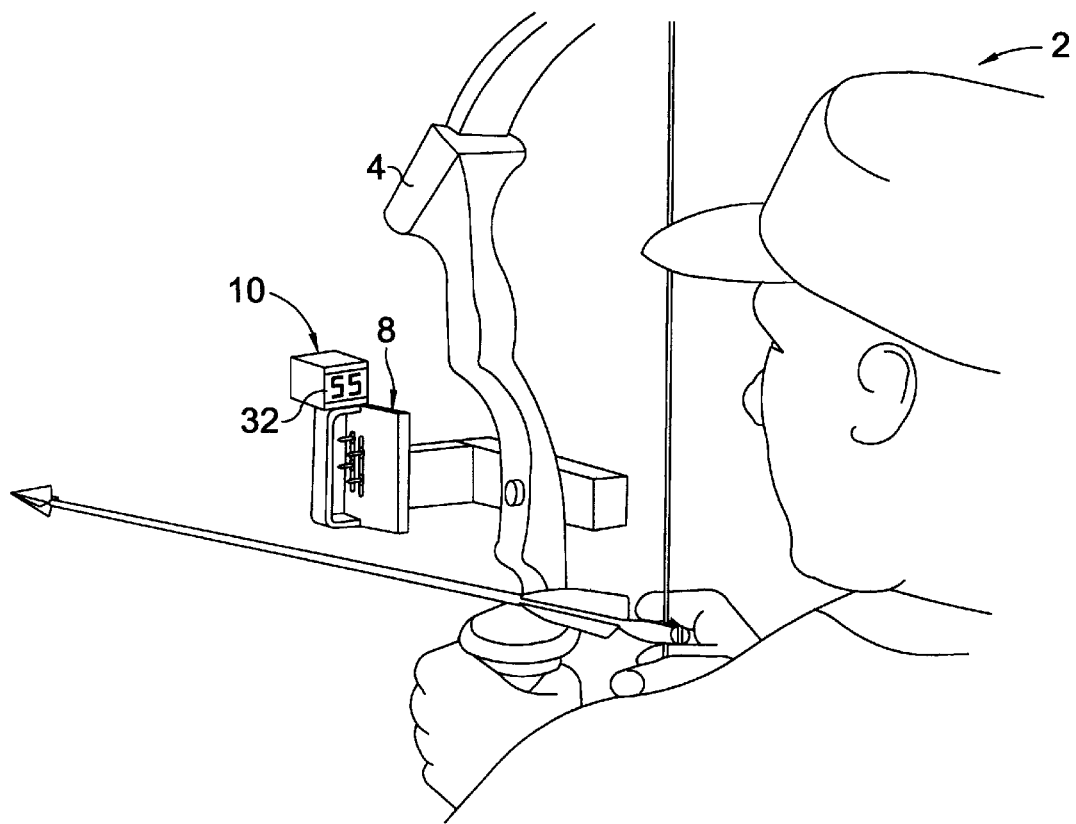
FIG. 3 is a perspective view of an archer using one preferred embodiment of the laser rangefinder bow sight apparatus in accordance with the present invention mounted on a hunting bow.

A close-up view of the hunter 2, the bow 4 and the bow sight 8 is shown in FIG. 3. The laser rangefinder 10 in this first embodiment of the invention is a self contained battery powered module which is preferably removably fastened to a conventional multi-pin bow sight 8. The laser rangefinder 10 may be removably fastened to the bow sight 8 by any conventional means, such as one or more screws, bolts, hook and loop fastener fabrics, adhesives or spring clips.

Figure 2:
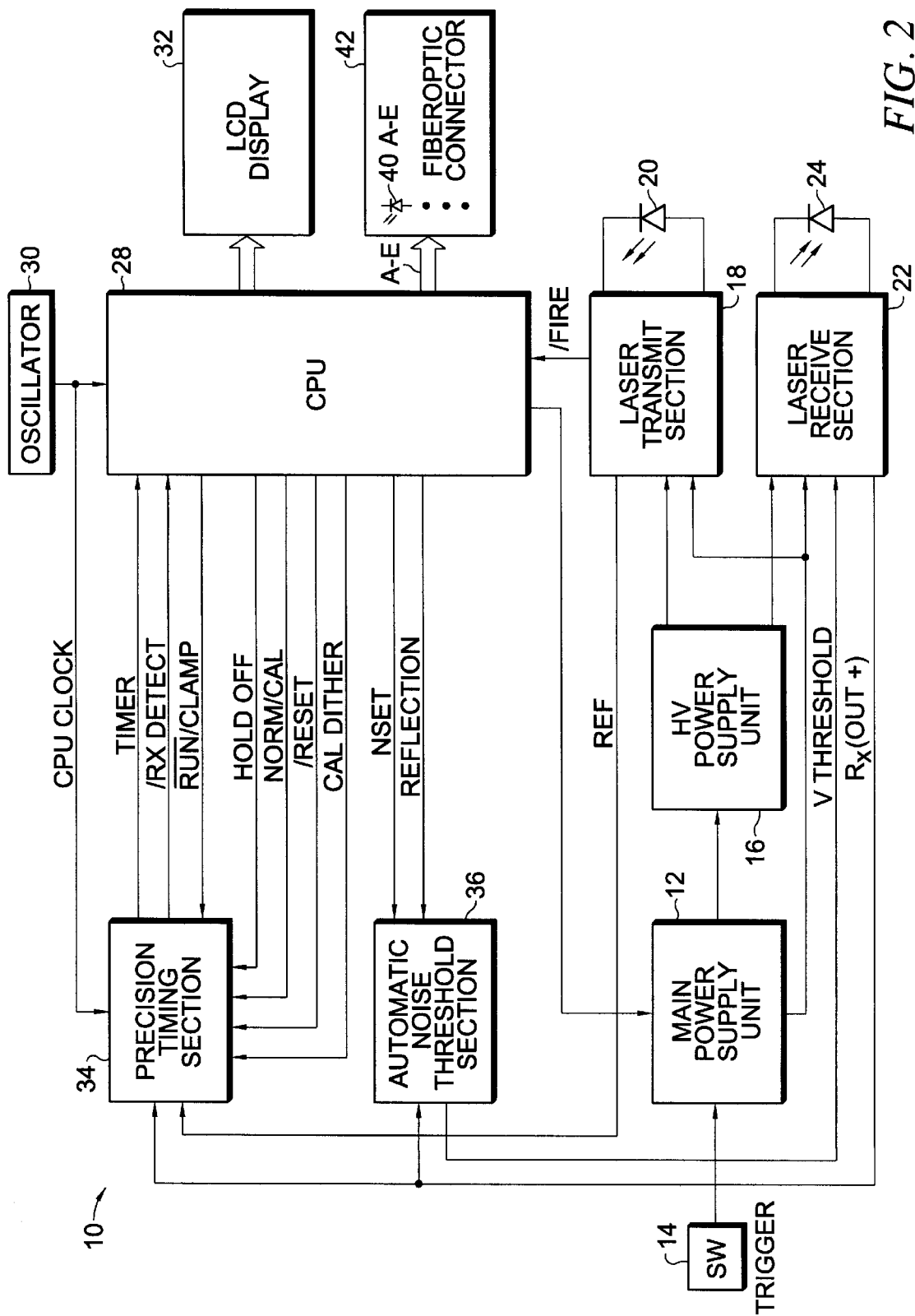
FIG. 2 is an electronic block diagram of the laser rangefinder bow sight apparatus in accordance with the invention.

With reference now to FIG. 2, a logic block diagram of a bow sight laser range finder 10 in accordance with the present invention is shown. The laser range finder 10 includes, in pertinent part, a main power supply unit ("PSU") 12 as operatively controlled by a trigger switch 14 which is preferably mounted on the grip portion of the compound bow. The main power supply unit 12 is coupled to a high voltage ("HV") power supply unit 16 for supplying operating power in conjunction with the main power supply unit 12 to a laser transmit section 18.

The laser transmit section 18 activates a laser emitting diode 20 for directing a laser signal toward an object in the operation of the laser range finder 10. The laser transmit section 18 also supplies a /FIRE signal to the central processing unit ("CPU") section 28. The main power supply unit 12 also supplies operating power to a laser receive section 22 which further has as an input a signal generated by a laser receiving diode 24 as the laser signal emitted from the laser emitting diode 20 is reflected from an object back thereto. The laser receive section 22 supplies a $V_{threshold}$ signal and RX(OUT+) signal to an automatic noise threshold section 36 and a precision timing section 34.

An oscillator 30 supplies a clocking signal to a CPU section 28 as well as to the precision timing section 34. The CPU section 28 provides an output indicative of the distance from the laser range finder 10 to an object as sighted by the archer 2 on a liquid crystal display (LCD) 32.

The precision timing section 34 provides a number of signals to the CPU section 28 including a TIMER and /RX DETECT signals as shown and receives a /CLAMP signal back therefrom. The CPU section 28 provides a number of signals to the precision timing section 34 including a HOLD OFF, NORM/CAL, /RESET, and a CAL DITHER signal. The automatic noise threshold section 36 also receives a number of inputs from the CPU section 28 including a number of noise set ("NSET") signals and a REFLECTION MODE signal to operatively control its function.

Internal circuitry operation of the precision timing section 34, the automatic noise threshold section 36, the laser transmit and receive sections 20 and 24, and the CPU 28 are more fully described in U.S. Pat. Nos. 5,574,552 and 5,703,678, assigned to the assignee of the present invention, and which are hereby incorporated by reference in their entirety.

In addition to providing the output to the LCD 32, the CPU 28 also has a series of outputs A–E as shown in FIG. 2 which provide, in the first embodiment, an output signal to a corresponding separate indicator light such as LEDs 40a–e. Each LED 40a–e is mounted to or at one end of one of the sight pins of the conventional multi-pin bow sight 8. Each LED 40a–e is electrically connected to its corresponding output A–E on the CPU 28 via electrical wires and each is lit in accordance with a user defined distance window which is programmed into the CPU 28. The CPU 28 determines from the measured distance and the programmed definitions of the distance windows which LED or set of LEDs to light.

Figure 4:
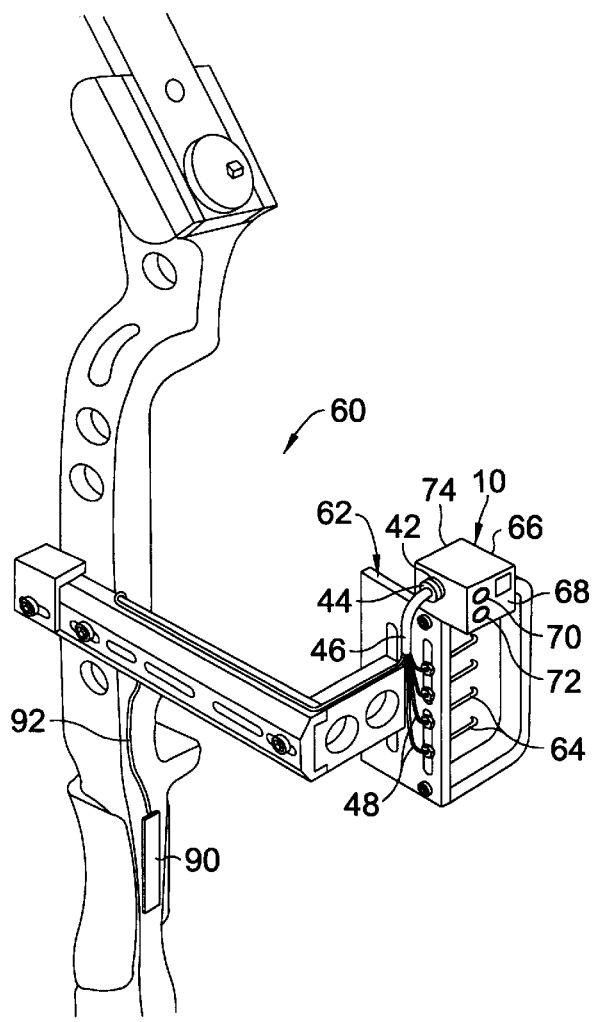
FIG. 4 is a front perspective view of a second embodiment of the bow sight apparatus in accordance with the invention.
Figure 5:
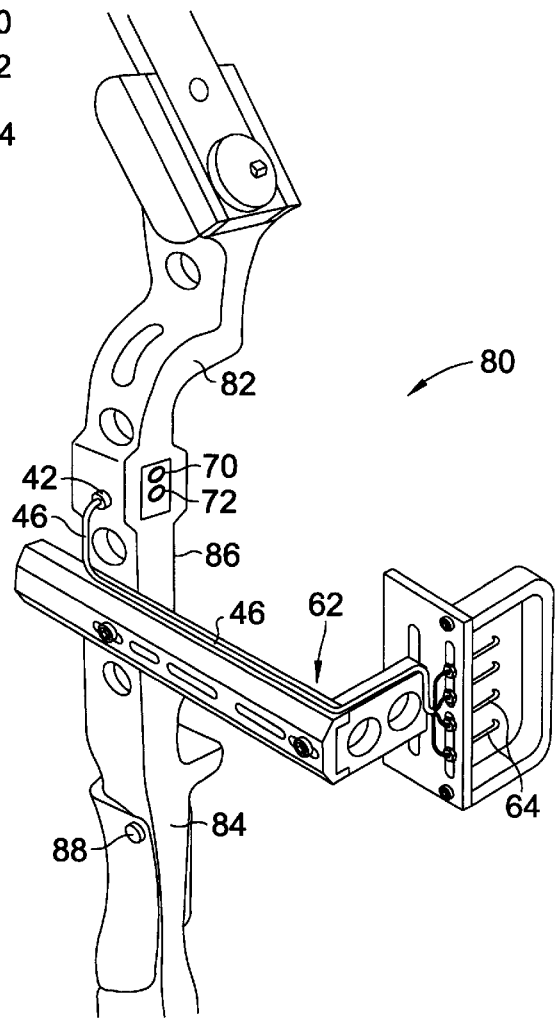
FIG. 5 is a front perspective view of a third alternative embodiment of the bow sight apparatus in accordance with the invention.

A second and a third embodiment of the present invention are shown in FIGS. 4 and 5 respectively. These two embodiments differ from the first embodiment primarily in that in addition to providing a display output to the LCD display 32 as described more fully in the patents referred to above, the LEDs 40a–e are mounted inside the rangefinder housing and the LED light is transmitted to the sighting pins via fiber optic cables. As in the first embodiment, the CPU 28 automatically selects and activates one or two of a series of outputs A through E, as is shown in FIG. 2. Outputs A through E each provide an input to a corresponding separate indicator LED 40a, b, c, d, or e. Each of the indicator LEDs 40a–e is in turn optically coupled to a light fiber socket connector 42. Each LED 40a–e is lit in accordance with a user defined distance window which is programmed into the CPU 28. The CPU 28 determines from the measured distance and the programmed definitions of the distance windows which LED or set of LEDs to light.

For example, if the user has calibrated the rangefinder 10 for four distances of 10 yards, 20 yards, 30 yards and 40 yards, LED 40a corresponds to the 10 yard distance, LED 40b corresponds to the 20 yard distance, LED 40c corresponds to the 30 yard distance, and LED 40d corresponds to the 40 yard distance. In this example, LED 40e would not be used. It should be understood that more or less optical fibers and LEDs may be provided for to accommodate for the appropriate number of aiming pins being utilized with the particular multi-pin sight. In the example illustrated, however, four aiming pins are provided.

The CPU 28 selects which of the four (or five) LEDs most closely corresponds to the actual measured target distance and lights that LED. In one exemplary arrangement, the CPU 28 simply lights the LED corresponding to the closest 10 yard distance. In another embodiment, the CPU 28 would light the two LEDs on either side of the measured distance. For example, if the measured range is 35 yards, the 30 yard LED 40c and the 40 yard LED 40d are lit.

Alternatively, the LED intensity can be varied in accordance with the proximity of a measured range to a calibration distance for each LED. For example, if the distance is 35 yards, then LEDs 40c and 40d will be lit equally. If the distance is 32 yards, the 30 yard LED 40c will be brighter lit than the 40 yard LED.

In another alternative indication scheme, utilizing visual coding, if the distance is 32 yards, the 30 yard LED 40c would be lit constantly and the 40 yard LED may be blinked twice, and then paused and repeated, to indicate an additional two yards above the 30 yard mark. If the distance is 38 yards, the 40 yard LED 40*d* would be lit constantly and the 30 yard LED would blink twice, then pause, and then repeat, to indicate two yards below the 40 yard mark. Other coding schemes such as variations in intensities of bracketing range window LEDs will be readily apparent to those skilled in the art.

FIG. 4 shows an enlarged front perspective view of a laser rangefinder bow sight 60 in accordance with the second embodiment of the present invention. The bow sight 60 incorporates a laser rangefinder 10 as described above, mounted on a conventional fiber optic multi-pin bow sight 62 which has, in this example, four aiming pins 64. The rangefinder 10 has a housing 66 having a front face 68 supporting lenses 70 and 72 for the laser diodes 20 and 24 respectively. and a rear face 74 supporting the LCD display screen 32. Each of the pins 64 is preferably a hollow brass tube carrying an optical fiber 48 therein.

Each of the LEDS 40*a–e* described above, is optically connected inside the housing 66 into the light fiber socket connector 42. The socket 42 is preferably a conventional light fiber socket connector which may be round or rectangular depending on whether the LED optical fiber ends are arranged in a circular pattern or in a row within the connector 42. The socket connector 42 is preferably mounted the bottom of the housing 66 of the rangefinder 10 or on the side of the housing 66 as is shown in FIG. 4.

A fiber optic cable connector 44 attached to one end of a fiber optic filament cable 46 is mated with the socket 42. The cable 46 in turn preferably carries four to six optical fibers 48. Each fiber 48 is threaded into and through one of the adjustable sight pins 64 on the bow sight 62 as shown in both FIGS. 4 and 5. Each of the sight pins 64 has an open tip 50 which is positioned directly toward the archer's line of sight. The free end of a fiber 48 is preferably positioned flush with the open end of the sight pin 64 so that it may be viewed by the archer 2. In this configuration, when an LED 40*a–e* is lit, the corresponding fiber tip will be seen by the archer 2 to light up or glow.

The laser range finder 10 in accordance with the present invention may be fastened to any existing bow sight such as is shown in FIG. 3 and used without the illuminated fiber optics. In this instance, the lights are simply fastened to the individual sighting pins. Alternatively, the laser rangefinder 60 in accordance with the invention as shown in FIG. 4, may be mounted on a conventional fiber optic bow sight 62, the original fibers removed from the bow sight 62, the fiber optic cable 46 connected to the socket 42, and the individual fibers 48 simply be threaded into the appropriate aiming or sighting pins 64. Alternatively, the cable 46 may come preassembled with aiming pins 64 connected to the individual fibers 48. In this case, the archer simply replaces the aiming pins that accompanied the conventional sight 62 with the new aiming pins 64. In this alternative, the multi-pin sight used may originally have been either a standard non-optical multi-pin sight or a fiber optic sight.

The laser rangefinder 10 in accordance with the present invention may also be built into the handle portion of a bow as is shown by the third embodiment 80 in FIG. 5. Here the bow 82 is hollowed to receive the housing 66 of the rangefinder 10 above the grip portion 84 and the sight support portion 86 so that the LED lenses 70 and 72 are directed directly at a potential target. Alternatively, in this embodiment, the housing 66 may be partially or entirely omitted as the body of the bow may function as the housing 66. The LCD screen 36 may be viewed through an aperture in the rear face (not shown) of the bow 82. In the embodiment 80 in FIG. 5, the connector 42 and cable 46 are routed preferably along the upper surface of the support arm of the multi-pin sight 62.

In this embodiment, the laser rangefinder 10 may be used without the optical fiber cable 46 along with any sighting device. The cable 46 need only be disconnected and a dust cap placed over the socket connector 42. The rangefinder 10 in the embodiment 80 shown in FIG. 5 includes a trigger switch button 88 mounted on the grip portion 84 so that the switch 14 projects from the handle or grip portion 84 at a position underlying one of the archer's fingers when holding the bow 82. Operation of this third embodiment is as described above except that the bow sight 62 may be changed or not used at all. The laser rangefinder 10 remains functional via the LCD display 32 which the archer 2 can see from the rear of the bow 82.

Referring back to FIG. 4, the trigger switch 14 in this second embodiment, as in the first embodiment shown in FIG. 3, is preferably a squeeze bulb strip or reed switch 90 adhesively bonded to the front of the grip portion of the bow. The strip 90 may alternatively be mounted to the side of the grip portion of the bow as the individual archer may prefer. Also shown in FIG. 4 is the conduit 92 from the strip 90 which is preferably routed along the top of the multi-pin support bracket to the laser rangefinder 10. The conduit 92 may attach to the rangefinder 10 separately or may be integrally fed through the connector 42 along with the fiber optic fibers.

The laser rangefinder 10 in accordance with the present invention includes a display hold feature that retains display of the last range for preferably a predetermined period of time after each range determination unless a new trigger switch activation is sensed by the CPU 28. Concurrent with the LCD display, the range window LEDs 40*a–e* are lit for the same period of time after each range measurement. This period of time may be set by the user and is preferably between 30 seconds to 1 minute duration.

The rangefinder 10 is preferably programmed for range windows, range display time, and other calibration parameters by coded actuation of the trigger switch 14. For example, switching to and from the calibration mode may be sensed by the CPU 28 by two trigger switch actuation within one second. When this occurs, the CPU 28 toggles between operating mode to calibrate mode and vice versa. Alternatively, a separate calibrate switch 98 may be provided on the housing 66 for this purpose.

The present invention may be practiced otherwise than as specifically described above. Many changes, alternatives, variations, and equivalents to the various structures shown and described will be apparent to one skilled in the art. For example, different switch configurations may be implemented. The fiber optic and electrical or pneumatic switch cable connections may be separate or integrated into one as shown in FIG. 4. The rangefinder 10 may be fastened to the frame of the bow 82 rather than the sight 8 should the archer prefer this configuration. In this latter bow mounted configuration, the sight 8 may be replaced with a peep sight arrangement. However, where a peep sight is utilized, the fiber optic sighting pin designations would not be available to the archer. The LEDs 40*a–e* may also be replaced by any suitable miniature light bulb arrangement. The LEDs or lights may be clipped or provided with a socket to mount the lights on conventional multi-pin sight pins or they may be integrated into replacement sight pins for use on conventional multi-pin sights.

Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. A laser range finder for use with a bow sight mounted on a bow comprising:
    a housing supporting therein a power supply, laser transmit and receive sections, a precision timing section and a central processing unit (CPU) for measuring distance to a target and a display means for indicating a measured distance to an archer aiming said bow toward said target;
    a trigger switch coupled through said housing to said sections, said switch being operable by said archer while aiming said bow to activate said sections and determine a measured distance toward said target;
    a display hold mechanism responsive to the trigger switch and coupled to said display means and operable to retain the display means in a state indicating said measured distance after said trigger switch is operated; and
    a mounting means on said housing for removably fastening said housing to a multi-pin bow sight fastened to said bow; and
    a plurality of range indicator lights coupled to said CPU, each light indicating a range window to said target.

2. The range finder apparatus according to claim 1 wherein each of the lights is adapted to be mounted to one of said sighting pins.

3. The range finder apparatus according to claim 1 wherein said plurality of range indicator lights are positioned in said housing with each being controlled by said CPU.

4. The range finder according to claim 3 wherein each of said lights is coupled to an optical fiber.

5. The range finder according to claim 4 wherein said each of said lights is a light emitting diode.

6. The range finder according to claim 4 wherein said CPU provides a predetermined distance range window for each of said lights.

7. The range finder according to claim 6 wherein said predetermined distance window is user progammable.

8. A laser range finder bow sight comprising:
    a multi-pin optic bow sight having a frame and a plurality of sighting pins adjustably positioned on said frame;
    a laser range finder housing fastened to said frame, said housing supporting therein a laser transmit section, a laser receive section, a precision timing section and a central processing unit (CPU) for measuring distance to a target coupled to a display comprising a plurality of distance window lights;
    a remote trigger switch connected to said sections in said housing, said switch being operable by said archer while aiming said bow to actuate said sections and said CPU to take a target range measurement;
    a plurality of optical fibers connected to said housing wherein each of said sighting pins is optically coupled to a separate one of said plurality of lights via one of said optical fibers.

9. The bow sight according to claim 8 wherein said lights are light emitting diodes.

10. The bow sight according to claim 8 wherein said optical fibers are carried in a fiber optic cable connected to said housing.

11. The bow sight according to claim 10 wherein said cable is connected to said lights in said housing via a removable fiber optic connector mating with a corresponding fiber optic socket connector.

12. The bow sight according to claim 8 wherein said remote trigger switch is a reed switch fastened to a hand grip portion of said bow.

13. A laser range finder bow sight for use on an archery bow, said sight comprising:
    a multi-pin fiber optic bow sight mounted on said bow, said sight having a frame and a plurality of sighting pins adjustably positioned on said frame;
    a laser range finder housing in said bow supporting therein a laser transmit section, a laser receive section, a precision timing section and a central processing unit (CPU) for measuring a distance to a target, the CPU being coupled to a display comprising a plurality of distance window lights;
    a remote trigger switch connected to said sections in said housing said switch being operable by said archer while aiming said bow to actuate said sections and said CPU to take a target range measurement; and
    a plurality of optical fibers connected to said housing wherein each of said sighting pins is optically coupled to a separate one of said plurality of lights via one of said optical fibers.

14. The bow sight according to claim 13 further comprising a liquid crystal display connected to said CPU.

15. The bow sight according to claim 13 wherein said plurality of lights are LEDs.

16. The bow sight according to claim 13 wherein said trigger switch is a reed switch fastened to a hand grip portion of said bow whereby an archer can trigger said range finder while aiming said bow at a target.

17. The bow sight according to claim 13 wherein said plurality of fibers are connected to said lights via a fiber optic cable connector and socket.

18. The bow sight according to claim 17 wherein said CPU assigns a distance window to each of said distance lights and activates said lights in a predetermined combination when said measured distance is between said predetermined distance windows.

19. The bow sight according to claim 18 wherein said distance windows are user programmable.

20. The bow sight according to claim 19 wherein said predetermined combination is visually coded.

21. A bow sight comprising:
    a laser range finder generating a signal indicating a measured distance to a target;
    a controller coupled to receive the measured distance indication and generate one or more display signals, wherein the display signals are modulated to code distance information into display signal; and
    a plurality of range indicator lights driven by the display signals wherein the range indicator lights are responsive to the modulation of the display signal to visually indicate the measured distance.

22. The bow sight of claim 21 wherein the modulation comprises modulating the relative intensity between two or more of the display signals to cause a corresponding light intensity difference between two or more of the indicator lights.

23. The bow sight of claim 21 wherein the modulation causes one or more of the indicator lights to blink.

24. The bow sight of claim 21 wherein the modulation causes the indicator lights to light in a preselected combination indicating the measured distance.

* * * * *